(12) United States Patent
Joshi et al.

(10) Patent No.: US 12,518,101 B2
(45) Date of Patent: Jan. 6, 2026

(54) AUTOMATED SYSTEM AND METHOD FOR HYPER PARAMETER TUNING AND RETROFITTING FORMULATION

(71) Applicant: Jio Platforms Limited, Gujarat (IN)

(72) Inventors: Prasad Pradip Joshi, Maharashtra (IN); Chinesh Doshi, Madhya Pradesh (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 325 days.

(21) Appl. No.: 17/823,845

(22) Filed: Aug. 31, 2022

(65) Prior Publication Data

US 2023/0082663 A1    Mar. 16, 2023

(30) Foreign Application Priority Data

Aug. 31, 2021    (IN) .............................. 202121039488

(51) Int. Cl.
| | | |
|---|---|---|
| *G06F 40/30* | (2020.01) | |
| *G06F 40/211* | (2020.01) | |
| *G06F 40/247* | (2020.01) | |
| *G06N 3/08* | (2023.01) | |
| *G06N 3/0985* | (2023.01) | |

(52) U.S. Cl.
CPC ............ *G06F 40/30* (2020.01); *G06F 40/211* (2020.01); *G06F 40/247* (2020.01); *G06N 3/08* (2013.01); *G06N 3/0985* (2023.01)

(58) Field of Classification Search
CPC ...... G06F 40/30; G06F 40/247; G06F 40/211; G06N 3/0985; G06N 3/08
See application file for complete search history.

(56) References Cited

U.S. PATENT DOCUMENTS 11,580,415 B2 *    2/2023   Fei ........................... G06N 3/08

OTHER PUBLICATIONS

Mrkšić, Nikola, Diarmuid O. Séaghdha, Blaise Thomson, Milica Gašić, Lina Rojas-Barahona, Pei-Hao Su, David Vandyke, Tsung-Hsien Wen, and Steve Young, "Counter-fitting Word Vectors to Linguistic Constraints", Jun. 2016, Proceedings of NAACL-HLT 2016, pp. 142-148. (Year: 2016).*

Desikan, Bhargav Srinivasa, Tasker Hull, Ethan Nadler, Douglas Guilbeault, Aabir Abubakar Kar, Mark Chu, and Donald Ruggiero Lo Sardo, "comp-syn: Perceptually Grounded Word Embeddings with Color", Dec. 2020, 28th International Conference on Computational Linguistics, pp. 1744-1751. (Year: 2020).*

(Continued)

*Primary Examiner* — Daniel C Washburn
*Assistant Examiner* — James Boggs
(74) *Attorney, Agent, or Firm* — FINNEGAN, HENDERSON, FARABOW, GARRETT & DUNNER, LLP

(57) ABSTRACT

The present invention provides a robust and effective solution for a novel pipeline to fine-tune the embedding with very less data and computational resources for making the embeddings semantically and contextually aware. Automated system and method for hyper parameter tuning and retrofitting formulation of information into the embeddings and then propose novel smooth extension to the formulation with a new way to automatically tune hyper parameters pipeline which can be used for wide business problems.

11 Claims, 8 Drawing Sheets

(56) References Cited

OTHER PUBLICATIONS

Robertson, A.R. et al., C. I. E. Draft Standard, 2007, "Colorimetry—Part 4: CIE 1976 L*a*b* colour space", CIE DS 014-4.3/E:2007. (Year: 2007).*

Mrkšić, Nikola, Ivan Vulić, Diarmuid Seaghdha, Ira Leviant, Roi Reichart, Milica Gašić, Anna Korhonen, and Steve Young, "Semantic Specialization of Distributional Word Vector Spaces using Monolingual and Cross-Lingual Constraints", 2017, Transactions of the Association for Computational Linguistics. (Year: 2017).*

Vulić, Ivan, Nikola Mrkšić, Roi Reichart, Diarmuid Ó. Séaghdha, Steve Young, and Anna Korhonen, "Morph-fitting: Fine-Tuning Word Vector Spaces with Simple Language-Specific Rules", Jul. 2017, Proceedings of the 55th Annual Meeting of the Association for Computational Linguistics, vol. 1, pp. 56-68. (Year: 2017).*

Gao, Xiaoyang, and Ryutaro Ichise, "Adjusting Word Embeddings by Deep Neural Networks", Feb. 2017, Proceedings of the 9th International Conference on Agents and Artificial Intelligence (ICAART 2017), pp. 398-406. (Year: 2017).*

Pennington, Jeffrey, Richard Socher, and Christopher D. Manning, "GloVe: Global Vectors for Word Representation", Oct. 2014, Proceedings of the 2014 Conference on Empirical Methods in Natural Language Processing (EMNLP), pp. 1532-1543. (Year: 2014).*

* cited by examiner

Color Thesaurus
Names of Color Shades

|   | Yellow | Orange | Red | Pink | Violet | Blue | Green | Brown | Gray |
|---|---|---|---|---|---|---|---|---|---|
| 1 | Yellow #FFF200 | Orange #FC6600 | Red #D30000 | Pink #FC0FC0 | Violet #B200ED | Blue #0018F9 | Green #3BB143 | Brown #7C4700 | Gray #828282 |
| 2 | Mellow #F8DE7E | Gold #F9A602 | Salmon #FA8072 | Ruby #E0115F | Hibiscus #B43757 | Denim #131E3A | Forest #0B6623 | Cedar #4B3A26 | Fossil #787276 |
| 3 | Cyber #FFD300 | Goldenrod #DBA520 | Scarlet #FF2400 | Ultra #FF6FFF | Mauve #784B84 | Pigeon #7285A5 | Sage #9DC183 | Cunnamon #622A0F | Mink #88807B |
| 4 | Royal #FADA5E | Pumpkin #FF7417 | Barn Red #7C0A02 | Thulian #FDE6FA1 | Mulberry #C64B8C | Sky #95C8D8 | Olive #708238 | Brunette #3A1F04 | Pearl River #D9DDDC |
| 5 | Trombone #D2B55B | Fire #FDA50F | Imperial #ED2939 | Magenta #FF0090 | Lavender #E4A0F7 | Independenc #4D516D | Lime #C7EA46 | Taway #7E481C | Abalone #D6CFC7 |
| 6 | Banana #FCF4A3 | Ochre #CC7722 | Indian Red #CD5C5C | Rose Pink #FF66CC | Orchid #AF69EE | Air Force #598BAF | Hunter #3F704D | Umber #362312 | Harbor Gray #C7C6C1 |
| 7 | Tuscany #FC12A | Amber #FFBF00 | Chili #C21807 | Lavender #FBAED2 | Lilac #B660CD | Baby Blue #89CFEF | Jade #00A86B | Tortilla #997950 | Smoke #BEBDB8 |
| 8 | Lemon #EFFD5F | Duon #C49102 | Fire Brick #B22222 | Creamy #FF96B4 | Electric #8F00FF | Navy #000080 | Artichoke #8F9779 | Chocolate #2B1700 | Thunder #BDB7AB |
| 9 | Bumblebee #FCE205 | Tangerine #CF9812A | Maroon #800000 | Fuchsia #FF00FF | African #B284BE | Steel #468284 | Fern #4F7942 | Syrup #492000 | Pewteer #999DA0 |
| 10 | Flax #EEDC82 | Tiger #FD6A02 | Redwood #A45A52 | French Rose #F64A8A | Grape #6F2DA8 | Carolina #57A0D2 | Jungle #29AB87 | Gingerbread #5C2C06 | Steel #777B7E |
| 11 | Cream #FFFDD0 | Hony #EB9605 | Rasppberry #D21F3C | Cerise #DE3163 | Amethyst #9966CB | Turikish #5097A4 | Laurel #A9BA9D | Caramel #613613 | Stone #877F7D |
| 12 | Peach #FFE5B4 | Carrot #EF7215 | Candy Apple #FF0800 | Carnation #FFA6C9 | Byzantine #702963 | Maya #73C2FB | Moss #8A9A5B | Walnut #43270F | Iron #48494B |
| 13 | Trombone #D2B55B | Fire #FDA50F | Carmine #960019 | Brick #FB607F | Fandango #B5338A | Cornflower #6693F5 | Mint #98FB98 | Pecan #48260D | Rhino #B9BBB6 |
| 14 | Banana #FCF4A3 | Ochre #CC7722 | Persian #CA3433 | Amaranth #F19CBB | Hello #DE73FF | Olympic #008ECC | Pine #01796F | Wood #402F1D | Trout #97978F |
| 15 | Tuscany #FC12A | Amber #FFBF00 | U.S. Flag #BF0A30 | Tafey #F987C5 | Floral #B47EDE | Sapphire #0F52BA | Tea #D0F0C0 | Hickory #351E10 | Seal #818380 |
| 16 | Lemon #EFFD5F | Duon #C49102 | Ferrari #FF2800 | Bubble Bum #FE5BAC | Thistle #D7BFDC | Azure #0080FE | Army #4B5320 | Espresso #4B382A | Lava #808588 |
| 17 | Bumblebee #FCE205 | Tangerine #CF9812A | Burgundy #8D021F | Hot Pink #F81894 | Royal #7852A9 | Egyptian #1134A6 | Emerald #50C878 | Peanut #795C32 | Shadow #363636 |
| 18 | Flax #EEDC82 | Tiger #FD6A02 | Crimson #BB0F0A | Punch #EC5578 | Lollipop #81007F | Yale #0E4C92 | Kelly #4CBB17 | Mocha #3B270C | Ash #544C4A |
| 19 | Egg Nog #F9E29C | Spice #793802 | Sangria #5E1914 | Lemonade #FDB9CB | Plum #8D4585 | Prussian #003151 | Sacramento #043927 | Coffee #4B3619 | Anchor #3E424B |
| 20 | Sepia #E3B778 | Burnt Or. #964000 | Mahogany #420D09 | Flamingo #FCA3B7 | Eggplant #311432 | Space #1C2951 | Sea #2E8B57 | Russet #7F461B | Charcoal #222021 |
|   | Yellow #FFF200 | Orange #FC6600 | Red #D30000 | Pink #FC0FC0 | Violet #B200ED | Blue #0018F9 | Green #3BB143 | Brown #7C4700 | Gray #828282 |

AUTOMATED SYSTEM AND METHOD FOR HYPER PARAMETER TUNING AND RETROFITTING FORMULATION

FIELD OF INVENTION

The embodiments of the present disclosure generally relate to Natural language processing (NLP). More particularly, the present disclosure relates to an automated system and method for facilitating retrofitting application specific information into the embeddings along with automated hyper parameter tuning and novel smooth retrofitting formulation which is shown to give better results compared to the discrete formulation.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Artificial Intelligence (AI) and Machine Learning is a booming technology in the industry. Machine learning (ML) includes computers finding how they can perform tasks without being explicitly programmed to do so. Natural language processing (NLP) refers to the branch of computer science—and more specifically, the branch of artificial intelligence or AI—concerned with giving computers the ability to understand text and spoken words in much the same way human beings can.

Word embedding is one of the most popular representations of document vocabulary, which is capable of capturing context of a word in a document, semantic and syntactic similarity, relation with other words, etc. Word embeddings are vector representations of a particular word. But, the vector representations in Global Vectors for Word Representation (Glove) are formed using distributional features (frequency of co-occurrence). But, certain analysis has proved that the vector representations in Glove are not much semantically aware. Particularly, the problem lies in the color shades similarity, where similar colors are placed far apart in the embedding space. Also, clear clusters for the shades of the colors are indistinguishable when the existing globally used embeddings (GLoVe) are plotted on a 2-D scatter plot using Principal Component Analysis (PCA).

Another prior art mechanism, ATTRACT-REPEL method was proposed for injecting linguistic constraints into word vector space representations. The procedure semantically specialises word vectors by jointly injecting mono and cross-lingual synonymy and antonymy constraints, creating unified cross-lingual vector spaces. ATTRACT-REPEL method is based on preserving distances between pairs of word vectors in the initial vector space, trying to 'pull' the words' neighbourhoods with them as they move to incorporate external knowledge. ATTRACT-REPEL-specialised vectors boost performance in the downstream tasks across multiple languages but, in the given approach each pair of similar words or dissimilar words embeddings get updated by the same amount, hence brings comparatively less similar words to be as close as the comparatively more similar words. ATTRACT-REPEL method is a Grid Search based approach to choose the hyperparameter making it a very unreliable and time-consuming process, if the process is applied on large corpus of words. Hence, it is unable to predict the extent of retrofitting required which might lead to stop at local minima. Using the same set of hyperparameters across all the training dataset leads to very dense clusters where comparatively less similar words coincide with the comparatively more similar words.

Existing known solution for getting the embeddings are not semantic and syntactic aware, but they are contextual aware. For example, many antonym words co-exist with each other in the embedding word space which hurts the performance for the use cases such as sentiment analysis, word/sentence similarity.

Other transformer-based approach for creating the embeddings required very large amount of data and computational resources which is a very difficult task.

There is, therefore, a need in the art to provide an automated system and a method that enable improved ways for fine-tuning the embedding with very less data and computational resources for making the embeddings semantically and contextually aware.

OBJECTS OF THE PRESENT DISCLOSURE

Some of the objects of the present disclosure, which at least one embodiment herein satisfies are as listed herein below.

It is an object of the present disclosure to provide an automated system and a method for facilitating pairing of similar words and dissimilar words to fine tune the existing embedding and get the novel embeddings which are syntactically, semantically and contextual aware which can be trained in minutes on CPU only.

It is an object of the present disclosure to provide an automated system and a method for facilitating retrofit the information into the embeddings and then propose novel smooth extension to the formulation with a new way to automatically tune hyper parameters pipeline.

It is an object of the present disclosure to provide an automated system and a method for fine-tuning the embeddings with very less data and computational resources for making the embeddings semantically and contextually aware.

It is an object of the present disclosure to provide an automated system and a method that facilitates the data getting encrypted and stored as it flows through the system.

It is an object of the present disclosure to provide a system and a method for down sampling of original sensitive information to lower environments for building Machine Learning and AI based Intelligent Systems without worrying about security aspects.

It is an object of the present disclosure to provide a system and a method to fine tune the existing embedding and get the novel embeddings which are syntactically, semantically and contextual aware.

It is an object of the present disclosure to provide a system and a method which can be trained quickly.

SUMMARY

This section is provided to introduce certain objects and aspects of the present invention in a simplified form that are further described below in the detailed description. This summary is not intended to identify the key features or the scope of the claimed subject matter.

In order to achieve the aforementioned objectives, the present invention provides a system and method for facilitating dynamic retrofitting of one or more embeddings of a word. The system may include one or more processors coupled to one or more computing devices in a network. The one or more processors may be further coupled with a memory that stores instructions which when executed by the one or more processors causes the system to: receive a set of data packets from the one or more computing devices, the set of data packets pertaining to a plurality of words and receive a predefined set of instructions from a knowledgebase associated with a centralized server operatively coupled to the one or more computing devices. The system may further extract a set of attributes from the set of data packets received, the set of attributes pertaining to one or more embeddings of each word of the plurality of words, the one or more embeddings being syntactically, semantically and contextual aware; and determine a similarity score based on the set of attributes extracted and the predefined set of instructions. Based on the similarity score, the system may further determine one or more synonymous vectors of each word with the plurality of words received.

In an embodiment, the one or more processors may be configured to determine a dissimilarity score based on the set of attributes extracted and the predefined set of instructions.

In an embodiment, the one or more processors may be configured to determine one or more of antonym vectors of each said word with the plurality of words received based on the dissimilarity score.

In an embodiment, the one or more processors may be configured to determine a value of margin of each said word with the plurality of words received based on the one or more synonymous vectors and the one or more antonym vectors determined.

In an embodiment, the one or more processors may be further configured to dynamically modify the value of margin of each word with the plurality of words received.

In an embodiment, based on the value of margin, the one or more processors may be further configured to bring a set of synonymous words in the plurality of the words nearer to each other.

In an embodiment, the one or more processors further may be configured to determine an antonym loss for each antonym vector responsible for taking one or more antonym vectors far apart from each antonym vector.

In an embodiment, the one or more processors may be further configured to determine a synonymy loss for each synonymous vector responsible for taking one or more synonymous vectors close to each antonym vector.

In an embodiment, the one or more processors may be further configured to determine a regularization loss responsible for preserving or modifying the one or more embeddings of each word.

In an embodiment, the one or more processors may be further configured to determine a first Delta International Commission on Illumination (CIE) score to update the one or more synonymous vectors to make the one or more synonymous vectors similar by a predefined value.

In an embodiment, the one or more processors may be further configured to determine a second Delta CIE score to update the one or more antonym vectors to make the one or more antonym vectors dissimilar by a predefined value.

In an embodiment, the one or more processors may be further configured to choose automatically similar or dissimilar words based on the updated one or more embeddings of each said word.

In an embodiment, the one or more processors may be further configured to fine-tune the one or more embeddings to make them semantically, syntactically and contextually aware.

In an embodiment, the one or more processors may be configured to train the set of data packets received to generate a trained model for automated retrofitting of a plurality of words.

In an aspect, the present disclosure provides for a method for facilitating dynamic retrofitting of one or more embeddings of a word. The method may include the steps of receiving, by one or more processors, a set of data packets from the one or more computing devices, the set of data packets pertaining to a plurality of words. In an embodiment, the one or more processors may be coupled to one or more computing devices in a network. In an embodiment, the one or more processors may be further coupled with a memory that memory stores instructions executed by the one or more processors. The method may also include the step of receiving, by the one or more processors, a predefined set of instructions from a knowledgebase associated with a centralized server operatively coupled to the one or more computing devices. Further, the method may include the steps of extracting, by the one or more processors, a set of attributes from the set of data packets received, the set of attributes pertaining to one or more embeddings of each word of the plurality of words, the one or more embeddings being syntactically, semantically and contextually aware and determining, by the one or more processors, a similarity score based on the set of attributes extracted and the predefined set of instructions. Based on the similarity score, the method may include the step of determining, by the one or more processors, one or more synonymous vectors of each word with the plurality of words received.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 3 illustrates exemplary representation (300) of existing system for the shelf glove/word2vec which is unaware of 'shade' similarity between colors, in accordance with an embodiment of the present disclosure.

The foregoing shall be more apparent from the following more detailed description of the invention.

BRIEF DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The present invention provides a robust and effective solution to an entity or an organization by enabling them to implement a system for facilitating format preserving encryption capability such that an encrypted value of sensitive dataset so that the data will not be available with its original value in a big data system and render sensitive field data as non-sensitive. Thus, sensitive data may be hidden from data-stores/warehouses without worrying about downstream access for the data. The system and method proposed may also preserve the data type and format of datasets but not limited to the like.

Figure 1:
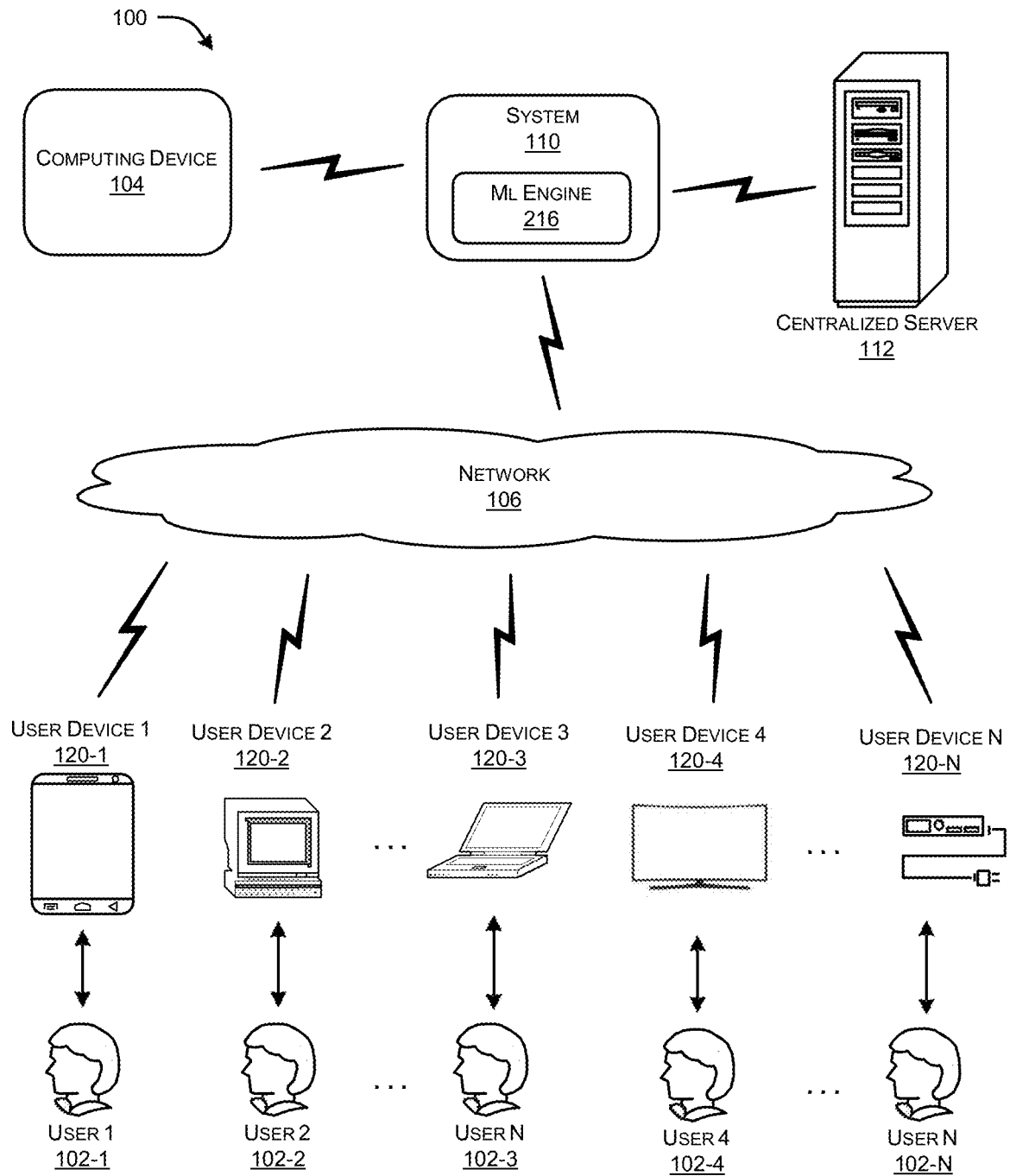
FIG. 1 illustrates an exemplary network architecture in which or with which the system of the present disclosure can be implemented, in accordance with an embodiment of the present disclosure.

Referring to FIG. 1 that illustrates an exemplary network architecture (100) in which or with which system (110) of the present disclosure can be implemented, in accordance with an embodiment of the present disclosure. As illustrated in FIG. 1, by way of example but not limitation, the exemplary architecture (100) may include a user (102) associated with a user computing device (120) (also referred to as user device (120)), at least a network 106 and at least a centralized server 112. More specifically, the exemplary architecture (100) includes a system (110) equipped with a machine learning (ML) engine (216) (illustrated in FIG. 2) for facilitating dynamic retrofitting for each entity pair by using a function based on similarity of the pair of words, which define the margin value in the loss function. The system (110) may be configured to receive a set of data packets. In an exemplary embodiment, the set of data packet may include word embeddings (for example words, colors but not limited to the like).

The system (110) may be then configured to compute the similarity and dissimilarity score between the pair words to be used for retrofitting. Thereby, dynamically modifying the value of margin which determines how much closer synonymous vectors should be to each other than to their respective negative examples.

The centralised server (112) may include a database (210) that may store a knowledgebase having a set of potential identity information associated with the user (102) and corresponding encrypted value. The user device (120) may be communicably coupled to the centralized server (112) through the network (106) to facilitate communication therewith. As an example, and not by way of limitation, network architecture (100) may include a second computing device (104) (also referred to as computing device hereinafter) associated with an entity. The computing device (104) may be operatively coupled to the centralised server (112) through the network (106). In an exemplary embodiment, the knowledge base may be in the form of a hive table but not limited to the like.

In an embodiment, the system (110) may be configured to receive a set of data packets from the one or more computing devices and a predefined set of instructions from a knowledgebase associated with a centralized server (112) operatively coupled to the one or more computing devices (104). The set of data packets pertaining to a plurality of words. The plurality of words may be for colors, retail data, synonyms, antonyms, product data, search data and the like. The predefined set of instructions may include techniques of artificial and deep learning processing and mathematical equations and the like.

The system (110) may then further extract a set of attributes from the set of data packets received, the set of attributes pertaining to one or more embeddings of each word of the plurality of words. A person skilled in the art may know that in natural language processing, embeddings of a word is used for the representation of words for Text Analysis in the form of a vector that performs the encoding of the meaning of the word such that the words which are closer in that vector space are expected to be similar in meaning.

The system (110) may further determine a similarity score based on the set of attributes extracted and the predefined set of instructions and based on the similarity score, determine one or more synonymous vectors of each word with the plurality of words received.

In an embodiment, the system (110) may further determine a dissimilarity score based on the set of attributes extracted and the predefined set of instructions. The system (110) may further be configured to determine one or more of antonym vectors of each word with the plurality of words received based on the dissimilarity score and further determine a value of margin of each word with the plurality of words received based on the one or more synonymous vectors and the one or more antonym vectors determined.

In an embodiment, the system (110) may be further configured to dynamically modify the value of margin of each said word with the plurality of words received and based on the value of margin, the system (110) may bring a set of synonymous words in the plurality of the words nearer to each other.

In another embodiment, the system (110) may determine an antonym loss for each antonym vector responsible for taking one or more antonym vectors far apart from each said antonym vector, a synonymy loss for each synonymous vector responsible for taking one or more synonymous vectors close to each said antonym vector and a regularization loss responsible for preserving or modifying the one or more embeddings of each word.

In another embodiment, the system may be further configured to determine a first Delta International Commission on Illumination (CIE) score and a second Delta CIE score. The first Delta CIE may be used to update the one or more synonymous vectors to make the one or more synonymous vectors similar by a predefined value while the second Delta CIE score may be used to update the one or more antonym vectors to make the one or more antonym vectors dissimilar by a predefined value.

In yet another embodiment, the system (110) may be further configured to choose automatically similar or dissimilar words based on the updated one or more embeddings of each said word.

In an embodiment, the one or more processors may be further configured to fine-tune the one or more embeddings to make them semantically, syntactically and contextually aware.

In an embodiment, the system (110) may be configured to train the set of data packets received to generate a trained model for automated retrofitting of a plurality of words.

The computing device (104) associated with the entity may enable the user to store/access only an encrypted value of the one or more embeddings in the system without exposing any sensitive fields.

In accordance with an embodiment and as illustrated in FIG. 1, on the user end, the architecture can enable a user to access information regarding an encryption/decryption key offered by the entity on their respective user devices (120). In an embodiment, the user can gain access to the system only when he/she has been identified and authorized by the system. In an embodiment, the user may include, but not limited to, an existing customer, a potential customer, a research analyst, or any other person interested to know about the services offered by the entity.

In an embodiment, the computing device (104) and/or the user device (120) may communicate with the system (110) via set of executable instructions residing on any operating system, including but not limited to, Android™, iOS™, Kai OS™ and the like. In an embodiment, computing device (104) and/or the user device (120) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen and the like. It may be appreciated that the computing device (104) and/or the user device (120) may not be restricted to the mentioned devices and various other devices may be used. A smart computing device may be one of the appropriate systems for storing data and other private/sensitive information.

In an exemplary embodiment, a network 106 may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber optic network, some combination thereof.

In another exemplary embodiment, the centralized server (112) may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

Figure 2:
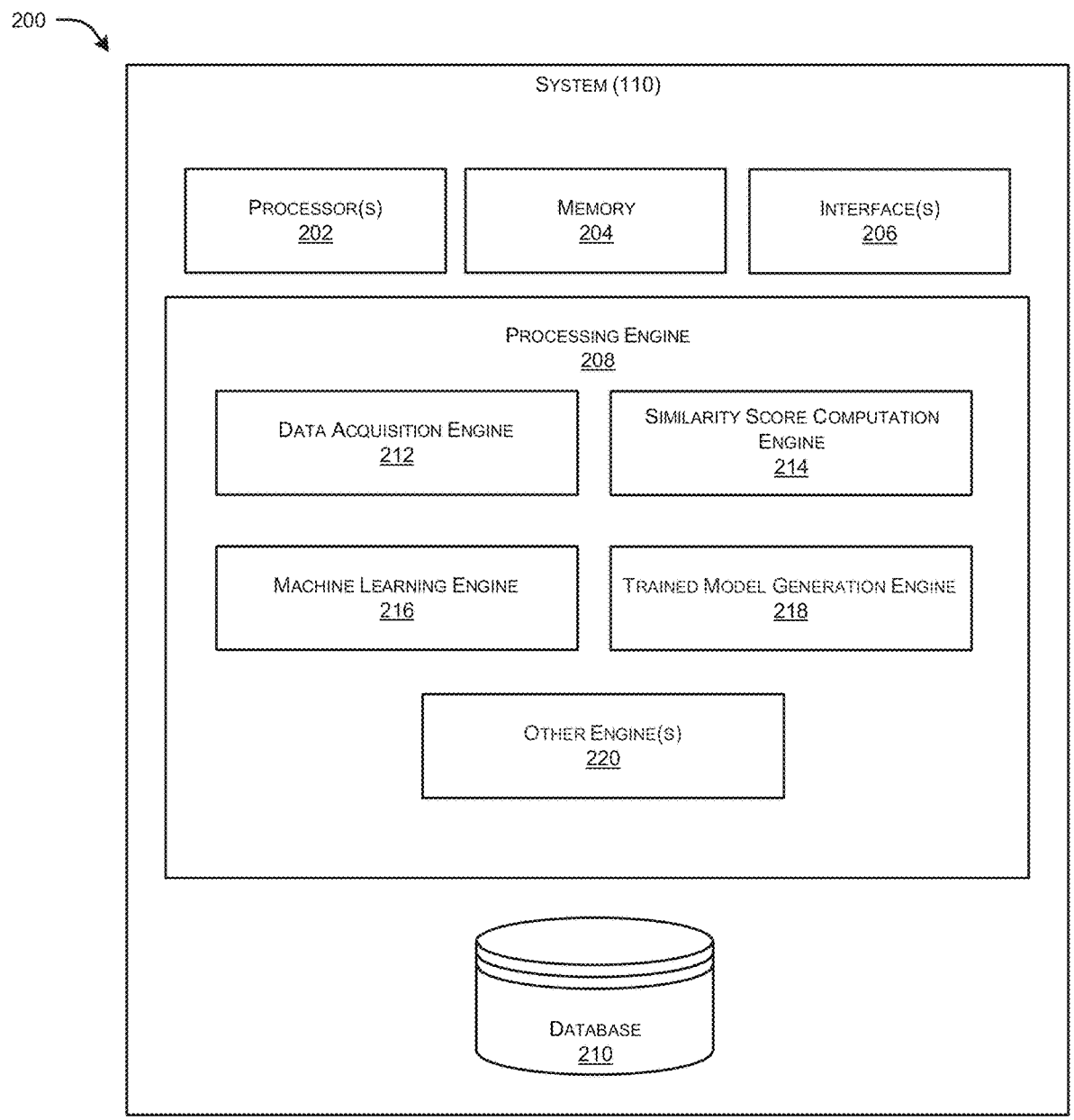
FIG. 2 illustrates an exemplary representation (200) of system (110) or a centralized server (112), in accordance with an embodiment of the present disclosure.

In an embodiment, the system (110) may include one or more processors coupled with a memory, wherein the memory may store instructions which when executed by the one or more processors may cause the system to perform dynamic retrofitting of one or more embeddings of a word. FIG. 2 with reference to FIG. 1, illustrates an exemplary representation of system (110) for facilitating dynamic retrofitting of one or more embeddings of a word, in accordance with an embodiment of the present disclosure. In an aspect, the system (110) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110) may include an interface(s) 206. The interface(s) 206 may comprise a variety of interfaces, for example, interfaces for data input and output devices, referred to as I/O devices, storage devices, and the like. The interface(s) 206 may facilitate communication of the system (110). The interface(s) 206 may also provide a communication pathway for one or more components of the system (110). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may comprise the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry.

The processing engine (208) may include one or more engines selected from any of a data acquisition engine (212), a similarity score computation engine (214), a machine learning (ML) engine (216), a trained model generation engine (218) and other engines (220). In an embodiment, the data acquisition engine (212) of the system (110) can receive a set of data packets pertaining to any finite set of symbols such as decimal integers used in defining sensitive information, multi-lingual alphabets used in defining sensitive information, mix of alphabets and numeric values in defining sensitive information. The similarity score computation engine (214) may compute the similarity and dissimilarity score between the pair words to be used for retrofitting. The ML engine (216) may be further configured to dynamically modify the value of margin which determines closer synonymous vectors. The trained model generation engine (218) may be configured generate a model for training the set of data packets received.

FIG. 3 illustrates exemplary representation (300) of existing system for the shelf glove/word2vec which is unaware of 'shade' similarity between colors, in accordance with an embodiment of the present disclosure.

Figure 4:
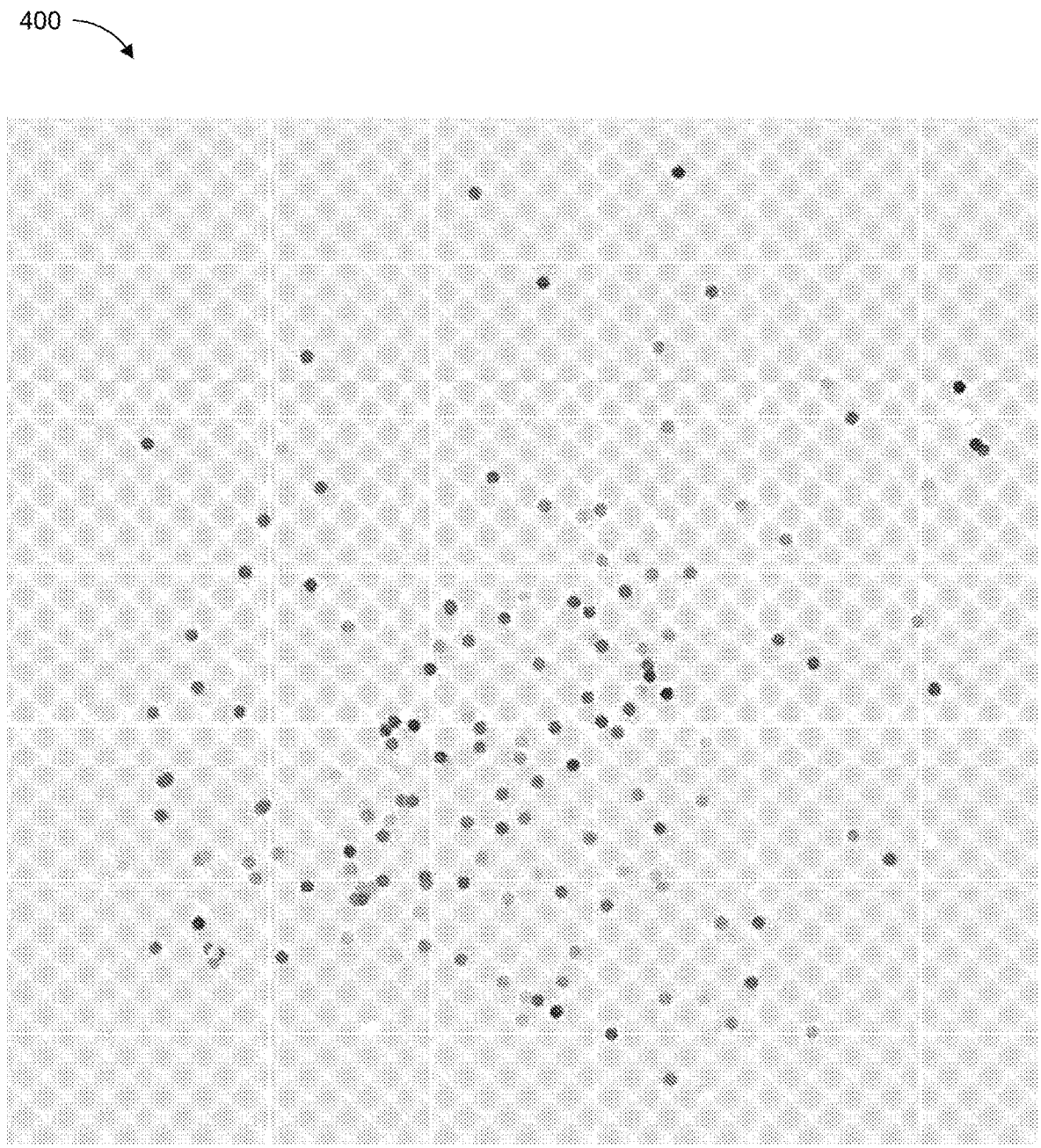
FIG. 4 illustrates an exemplary representation (400) of existing system PCA-2D components representation of the Glove Embeddings having 50 dimensions (50-D), in accordance with an embodiment of the present disclosure.

FIG. 3 represents the vector representation in Glove, which is formed using distributional features (frequency of co-occurrence). Presence of semantic information is not present such that similar color shades are placed far apart and dissimilar colors like red-blue, black-white are placed very close to each other in the embeddings representation. Further, there are many colors which are represented using bigrams that are not present in the Glove embeddings or any other widely used embeddings. FIG. 4 illustrates an exemplary representation (400) of an existing system for the shelf glove/word2vec in 2D, in accordance with an embodiment of the present disclosure.

Figure 5:
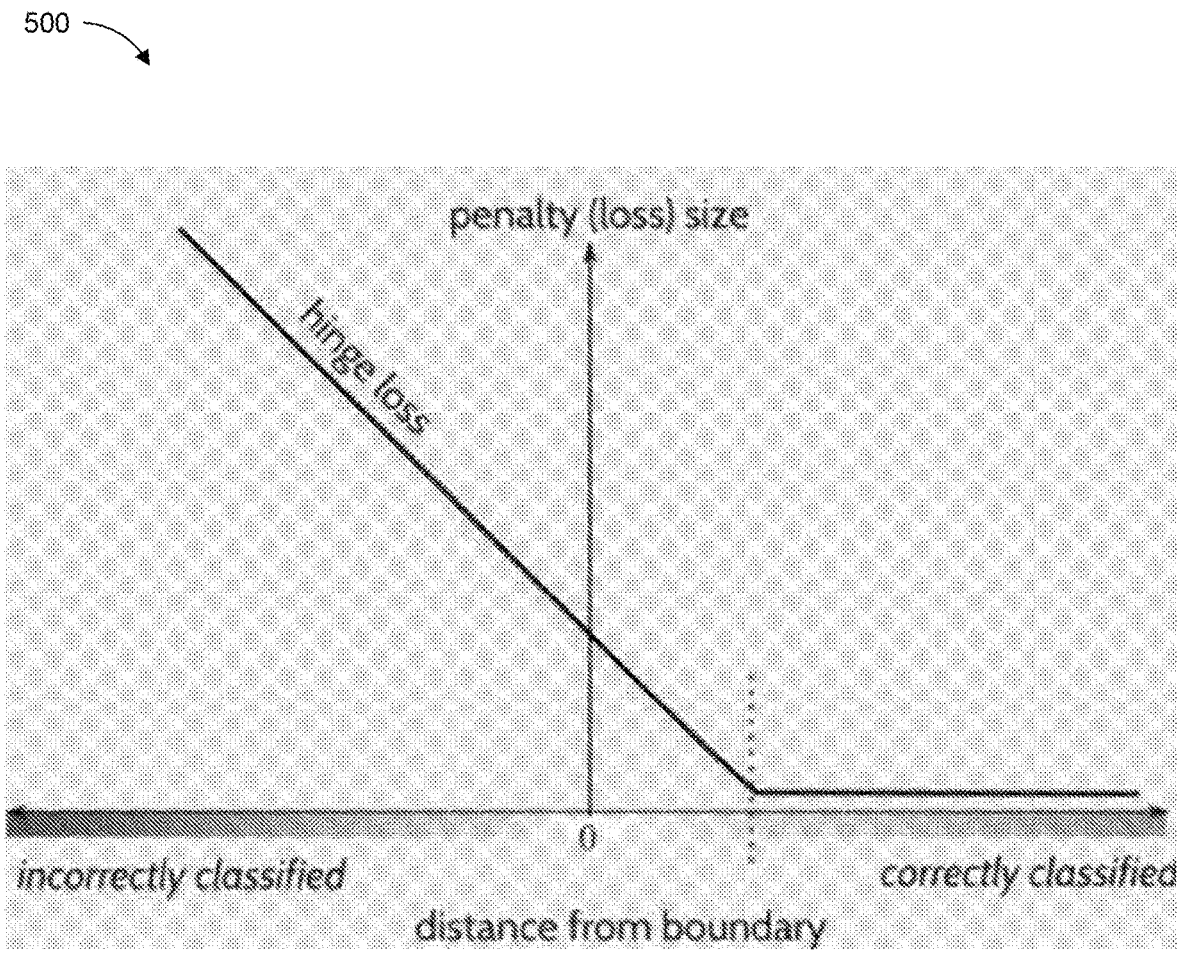
FIG. 5 illustrates an exemplary representation (500) of proposed retrofitting formulation for defining color similarity, in accordance with an embodiment of the present disclosure.

FIG. 5 illustrates an exemplary representation (500) of proposed retrofitting formulation for defining color similarity, in accordance with an embodiment of the present disclosure.

In an embodiment, the color shade use case is considered for embedding space, the nearby colors in the embedding space include similarity with each other. The proposed system and method implement attract repel retrofitting algorithm to bring the similar color vector nearby to each other in the embedding space.

In another embodiment, Delta CIE Score ($E_{ab}*$) is computed for defining color similarity mathematically as depicted in equation (1):

$$\Delta E_{ab}* = \sqrt{(L_2*-L_1*)^2 + (a_2*-a_1*)^2 + (b_2*-b_1*)^2}, \quad \text{equation (1)}$$

LAB: It expresses color as three values: L* for perceptual lightness, and a* and b* for the four unique colors of human vision: red, green, blue, and yellow.

RGB color values are converted to LAB color values. Using the LAB color value color similarity is calculated by the following formula: Delta CIE score ($E_{ab}*$).

In an embodiment, Delta CIE score ($E_{ab}*$) can be used to define similar and dissimilar colors to each other. Delta CIE score ($E_{ab}*$) is used as it resembles closely with how human perceives the change in color.

In an embodiment, the attract repel retrofitting algorithm is computed to bring the similar color vector nearby to each other in the embedding space as depicted in equation (2), where objective function: update x (current embedding vector) while minimizing C ($\beta s$, $\beta a$).

$$C(\beta_s, \beta_a) = S(\beta_s) + A(\beta_a) + R(\beta_s, \beta_a). \quad \text{Equation (2)}$$

where,
$A(\beta_s)$=Antonymy loss, which is responsible for taking the two antonym/dissimilar vectors far apart,
$S(\beta_A)$=Synonymy loss, which is responsible for bringing the two synonyms vectors close to each other, and
$R(\beta_s, \beta_A)$=Regularization loss, which is responsible for preserving or modifying the existing embedding of the given word.

In another embodiment, the synonymy loss S(BA) can be computed by using the equation (3), where, $x_l x_r$ is the dot product of the vector's $x_l$ and $x_r$, where $x_l$ and $x_r$ are synonym to each other. More similar the $x_l$ and $x_r$ are more would be the magnitude of the dot product hence subtracting larger value from a value will therefore help us minimizing the loss.

$$S(\beta_A) = Synonmy \text{ loss} \qquad \text{equation (3)}$$

$$S(\beta_S) = \sum_{(x_l, x_r) \in \beta_S} \begin{bmatrix} \max(0, (\delta_{syn} + x_l t_l - x_l x_r)) + \\ \max(0, (\delta_{syn} + x_r t_r - x_l x_r)) \end{bmatrix}$$

where,
$t_l$, $t_r$=Negative Word (Randomly chosen
$x_l$, $x_r$=Antonym or Synonym Word Pair
x*x*=Dot Product of Vectors)
$\delta_{syn}$=similarity margin which determines how much closer synonymous vectors should be to each other than to their respective negative examples
$\delta_{ant}$=dissimilarity margin which determines how far apart antonymous vectors should be to each other than to their respective negative examples.

In another embodiment, the antonymy loss $A(\beta_s)$ can be computed by using the equation (4), where, $x_l x_r$ is the dot product of the vectors $x_l$ and $x_r$ where $x_l$ and $x_r$ are antonym to each other. Lesser similar the $x_l$ and $x_r$ are less would be the magnitude of the dot product hence subtracting larger value from a value will therefore help us minimizing the loss.

$$A(\beta_S) = Antonymy \text{ loss} \qquad \text{equation (4)}$$

$$A(\beta_S) = \sum_{(x_l, x_r) \in \beta_A} \begin{bmatrix} \max(0, (\delta_{ant} + x_l x_r - x_l t_l)) + \\ \max(0, (\delta_{ant} + x_l x_r - x_r t_r)) \end{bmatrix}$$

where,
$t_l$, $t_r$=Negative Word (Randomly chosen
$x_l$, $x_r$=Antonym or Synonym Word Pair
$\delta_{syn}$=similarity margin which determines how much closer synonymous vectors should be to each other than to their respective negative examples $\delta_{ant}$=dissimilarity margin which determines how far apart antonymous vectors should be to each other than to their respective negative examples.

In another embodiment, the Regularization loss $R(\beta_s, \beta_A)$ can be computed by using the equation (5), $$R(B_S, B_A) = \sum_{x_r \in V(B_S \cup B_A)} \lambda_{reg} \|\hat{x}_i - x_i\|_2 \quad \text{equation (5)}$$

where, $x_l$, $x_r$=Antonym or Synonym Word Pair x*x*=Dot Product of Vectors

λ=Parameter to preserve the original embedding of the given word (higher the parameter more is the original embedding preserved).

As illustrated, in Table 1 and FIG. 5, hinge Loss refers to Max (0,1−y·f(x)). The hinge loss function is the similarity margin which determines how much closer synonymous vectors should be to each other than to their respective negative examples.

TABLE 1

| Loss | Type of loss |
|---|---|
| Synonymy Loss | Hinge Loss |
| Antonymy Loss | Hinge Loss |
| Regularization Loss | L2 Loss |

In an embodiment, L2–Norm→higher the regularization value lesser would be the change in the weights. Eg: Root word: "Orange". The nearest words to "orange" in Glove Embedding are blue, red, yellow, green, purple, black, pink, colored, white etc. Using the Delta CIE Score the similar color to orange is obtained such as flax, cinnabar, fallow, bittersweet, tangerine etc. So, for training set following could be a pair:

Synonym Pair: ("orange", "flax") and Random Pair: ("orange", "blue")

In an embodiment, the retrofitting algorithm will update the vectors using Gradient Descent optimizer to make the vectors more similar of (orange and flax) as compared to the pair (orange and blue) using the Delta CIE Score the dissimilar color to orange are obtained such as grape, violet, blue, fuchsia etc.

Antonym Pair: ("orange", "grape") and Random Pair: ("orange", "black")

In an embodiment, the retrofitting algorithm will update the vectors using Gradient Descent optimizer to make the vectors more dissimilar (orange and red) as compared to the pair (orange and blue) as depicted in Table 2.

TABLE 2

| Nearest Glove Word | Synonyms | Antonyms |
|---|---|---|
| 'blue' | 'mango' | grape |
| 'red' | 'persian orange' | violet |
| 'yellow' | 'carrot orange' | Electric purple |
| 'green' | 'peach-orange' | fuchsia |
| 'purple' | 'santare ka chhilaka' | blue |
| 'black' | 'burnt orange' | violet |
| 'pink' | 'international orange' | veronica |
| 'colored' | 'atomic tangerine' | French violet |
| 'white' | 'persimmon' | heliotrope |

Figure 6A:
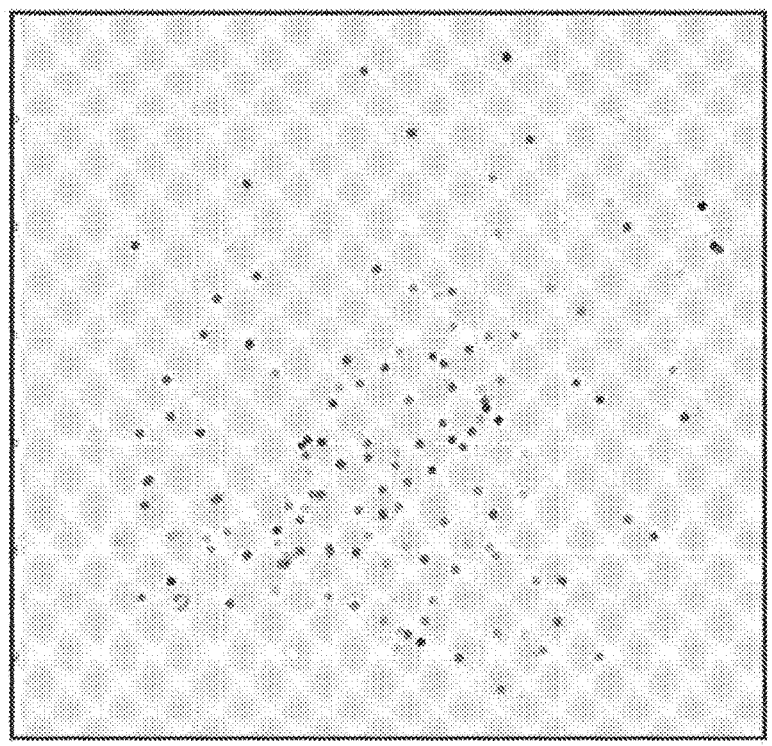
FIG. 6A illustrates an exemplary representation (600) of proposed PCA-2D components representation of the Glove Embeddings having 50 dimensions (50-D), in accordance with an embodiment of the present disclosure.

FIG. 6A illustrates an exemplary representation (600) of prior art PCA-2D components representation of the Glove Embeddings (50-D), in accordance with an embodiment of the present disclosure. As illustrated, each pair of similar words or dissimilar words embeddings get updated by the same amount, which brings comparatively less similar words to be as close as the comparatively more similar words. Thus, leading to very dense output.

Figure 6B:
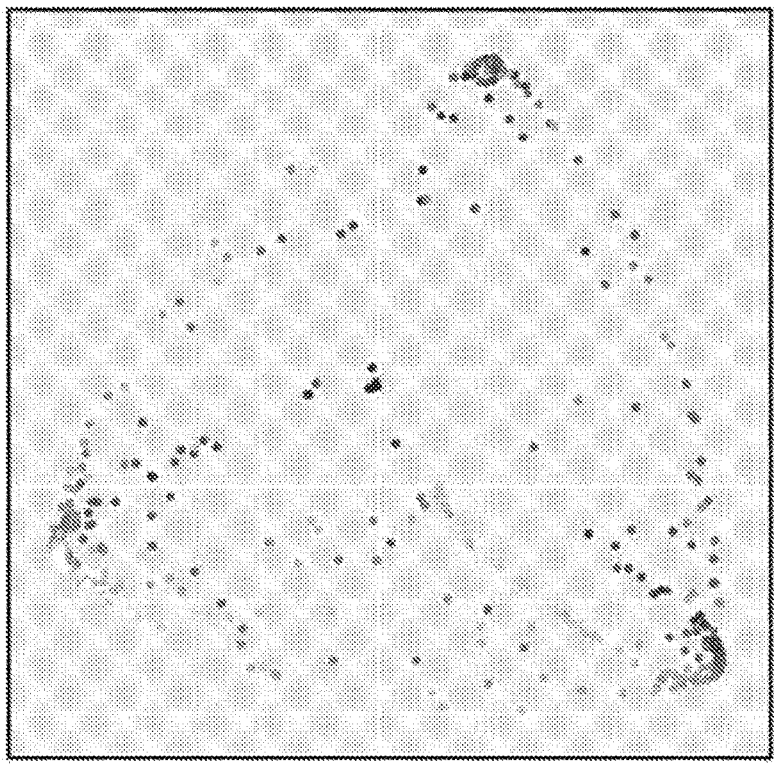
FIG. 6B illustrates an exemplary representation (600) of proposed PCA-2D components representation of the Retrofitted Embeddings having 50 dimensions_(50-D), in accordance with an embodiment of the present disclosure.

FIG. 6B illustrates an exemplary representation (600) of proposed PCA-2D components representation of the Retrofitted Embeddings (50-D), in accordance with an embodiment of the present disclosure. As illustrated, dynamic retrofitting for each entity pair by using a function based on similarity of the words pairs are defined the margin value in the loss function. Using domain specific classifiers to define the value of Lambda in the loss function.

Figure 7A:
FIG. 7A illustrates an exemplary representation (700) of default retrofitted embedding—dense clusters and strict color transition, in accordance with an embodiment of the present disclosure.
Figure 7B:
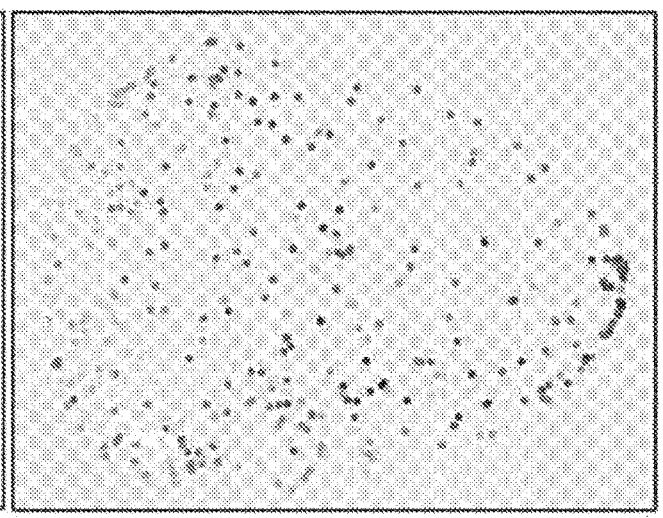
FIG. 7B illustrates an exemplary representation (700) of weighted retrofitted embedding—smoother color transition, in accordance with an embodiment of the present disclosure.

FIG. 7A illustrates an exemplary representation (700) of default retrofitted embedding—dense clusters and strict color transition, in accordance with an embodiment of the present disclosure. FIG. 7B illustrates an exemplary representation (700) of weighted retrofitted embedding—smoother color transition, in accordance with an embodiment of the present disclosure. As illustrated, we proposed invention choose automatically depending on their existing/updated embeddings, rather than putting the same amount of penalty (margin, lambda) for updating the embeddings. Higher the domain/contextual/semantic similarity score, more would be the value of lambda as we would want lesser updates in the current embedding and vice-versa. If the words have to similar by higher score, then value of margin should be higher for synonym margin value. Further, if the words have to dissimilar by higher score, then value of margin should be higher for antonym margin value. Table 3 can be considered for Fashion domain and color similarity use case.

TABLE 3

| Nearest Glove Word, Nearby Color similarity Score (used for Lambda) | Synonyms, Pair wise Color Similarity Score (Used for Margin) | Antonyms |
|---|---|---|
| 'blue', 0.23 | 'mango', 0.99 | grape |
| 'red', 0.67 | 'persian orange', 0.95 | violet |
| 'yellow', 0.52 | 'carrot orange', 0.92 | Electric purple |
| 'green', 0.28 | 'peach-orange', 0.92 | fuchsia |
| 'purple', 0.12 | 'santare ka chhilaka', 0.91 | blue |
| 'black', 0.24 | 'burnt orange', 0.90 | violet |
| 'pink', 0.42 | 'international orange', 0.90 | veronica |
| 'coral', 0.19 | 'atomic tangerine', 0.89 | French violet |
| 'white', 0.39 | 'persimmon' 0.85 | heliotrope |

In another embodiment, table 3 is obtained from Delta CIE score, thus the nearby corpus of the word 'orange' is not semantically good considering color similarity. The second column includes the ordinal similarity which is embedded in the word embeddings, where the equations (6) and (7):

$$S(\beta_S) = \sum_{(x_l, x_r) \in \beta_S} \begin{matrix} [\max(0, (\delta *_{syn} + x_l t_l - x_l x_r)) + \\ \max(0, (\delta *_{syn} + x_r t_r - x_l x_r))] \end{matrix} \quad \text{equation (6)}$$

$$A(\beta_A) = \sum_{(x_l, x_r) \in \beta_A} \begin{matrix} [\max(0, (\delta *_{ant} + x_l x_r - x_l t_l)) + \\ \max(0, (\delta *_{ant} + x_l x_r - x_r t_r))] \end{matrix} \quad \text{equation (7)}$$

where,

δ* is the margin

λ* is the lambda used for regularization term.

δ*=ƒ(δ, Pair_wise_similarity_score) Where, f can be any monotonic polynomial increasing function.

λ*=ƒ(λ, near_by_similarity_score) Where, f can be any monotonic polynomial increasing function.

Figure 8:
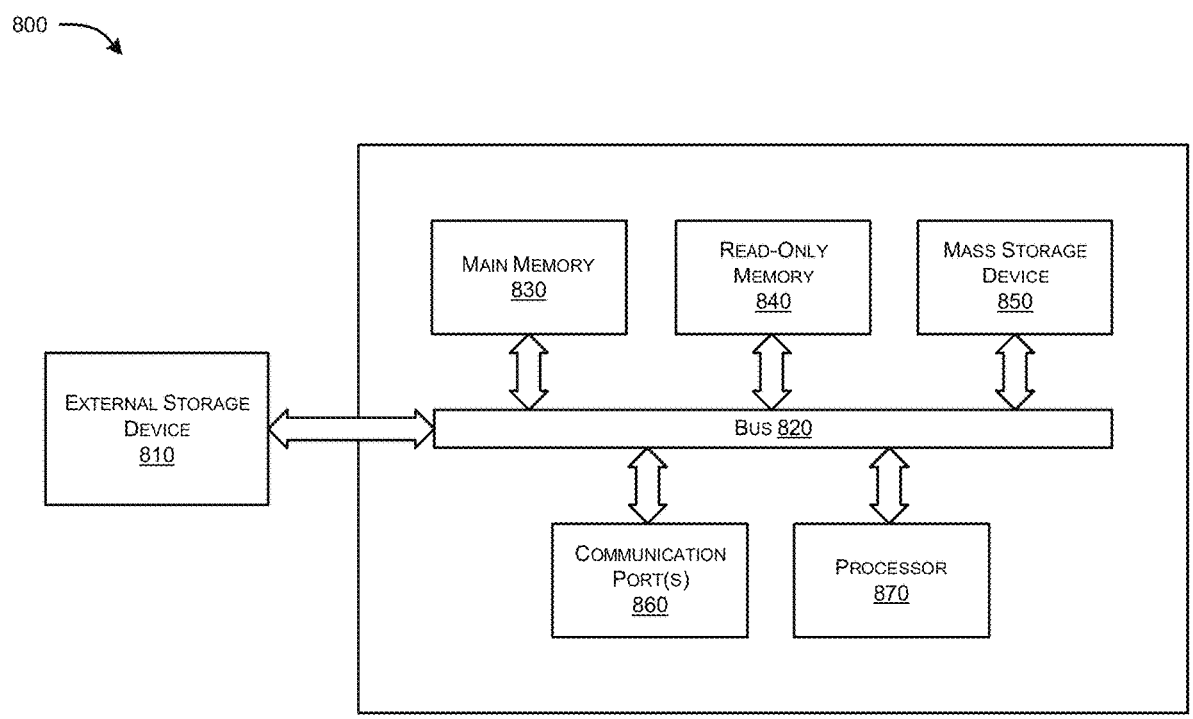
FIG. 8 illustrates an exemplary computer system in which or with which embodiments of the present invention can be utilized, in accordance with embodiments of the present disclosure.

FIG. 8 illustrates an exemplary computer system in which or with which embodiments of the present invention can be utilized, in accordance with embodiments of the present disclosure.

FIG. 8 illustrates an exemplary computer system in which or with which embodiments of the present invention can be utilized in accordance with embodiments of the present disclosure. As shown in FIG. 8, computer system 800 can include an external storage device 810, a bus 820, a main memory 830, a read only memory 840, a mass storage device 850, communication port 860, and a processor 870. A person skilled in the art will appreciate that the computer system may include more than one processor and communication ports. Examples of processor 870 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 870 may include various modules associated with embodiments of the present invention. Communication port 860 can be any of an RS-232 port for use with a modem based dialup connection, a 10/100 Ethernet port, a Gigabit or 10 Gigabit port using copper or fiber, a serial port, a parallel port, or other existing or future ports. Communication port 860 may be chosen depending on a network, such a Local Area Network (LAN), Wide Area Network (WAN), or any network to which computer system connects. Memory 830 can be Random Access Memory (RAM), or any other dynamic storage device commonly known in the art. Read-only memory 840 can be any static storage device(s) e.g., but not limited to, a Programmable Read Only Memory (PROM) chips for storing static information e.g., start-up or BIOS instructions for processor 870. Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 13K800), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 820 communicatively couples processor(s) 870 with the other memory, storage and communication blocks. Bus 820 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 870 to software system.

Optionally, operator and administrative interfaces, e.g. a display, keyboard, and a cursor control device, may also be coupled to bus 820 to support direct operator interaction with a computer system. Other operator and administrative interfaces can be provided through network connections connected through communication port 860. The external storage device 810 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

ADVANTAGES OF THE PRESENT DISCLOSURE

The present disclosure provides for an automated system and a method for facilitating pairing of similar words and dissimilar words to fine tune the existing embedding and get the novel embeddings which are syntactically, semantically and contextual aware which can be trained in minutes on CPU only.

The present disclosure provides for an automated system and a method for facilitating retrofit the information into the embeddings and then propose novel smooth extension to the formulation with a new way to automatically tune hyper parameters pipeline.

The present disclosure provides for an automated system and a method for fine-tuning the embeddings with very less data and computational resources for making the embeddings semantically and contextually aware.

The present disclosure provides for an automated system and a method that facilitates the data getting encrypted and stored as it flows through the system.

The present disclosure provides for a system and a method for down sampling of original sensitive information to lower environments for building Machine Learning and AI based Intelligent Systems without worrying about security aspects.

We claim:

1. A system or facilitating dynamic retrofitting of one or more embeddings of a word, said system comprising:
   one or more processors coupled to one or more computing devices in a network, wherein the one or more processors are further coupled with a memory, and wherein said memory stores instructions which when executed by the one or more processors causes the system to:
   receive a set of data packets from the one or more computing devices, the set of data packets pertaining to a plurality of words;
   receive a predefined set of instructions from a knowledgebase associated with a centralized server operatively coupled to the one or more computing devices;
   extract a set of attributes from the set of data packets received, the set of attributes pertaining to one or more embeddings of each word of the plurality of words, wherein the one or more embeddings are syntactically, semantically and contextually aware;
   determine a similarity score based on the set of attributes extracted and the predefined set of instructions;
   determine one or more synonymous vectors of each said word with the plurality of words received based on the determined similarity score;

determine a dissimilarity score based on the set of attributes extracted and the predefined set of instructions;

determine one or more of antonym vectors of each said word with the plurality of words received based on the determined dissimilarity score;

determine a value of margin of each said word with the plurality of words received based on the one or more synonymous vectors and the one or more antonym vectors determined;

dynamically modify the value of margin of each said word with the plurality of words received based on a domain-specific classifier that determines an extent of retrofitting required for each word pair;

bring a set of synonymous words in the plurality of words nearer to each other based on the modified value of margin; and determine a regularization loss responsible for preserving or modifying the one or more embeddings of each said word.

2. The system as claimed in claim 1, wherein the one or more processors are further configured to:

determine an antonym loss for each antonym vector responsible for increasing a separation distance between one or more antonym vectors and each said antonym vector; and determine a synonymy loss for each synonymous vector responsible for reducing the separation distance between one or more synonymous vectors and each said synonymous vector.

3. The system as claimed in claim 1, wherein the one or more processors are further configured to determine a first Delta International Commission on Illumination (CIE) score to update the one or more synonymous vectors to make the one or more synonymous vectors similar by a predefined value.

4. The system as claimed in claim 1, wherein the one or more processors are further configured to determine a second Delta CIE score to update the one or more antonym vectors to make the one or more antonym vectors dissimilar by a predefined value.

5. The system as claimed in claim 1, wherein the one or more processors are further configured to choose automatically similar or dissimilar words based on updated one or more embeddings of each said word.

6. The system as claimed in claim 1, wherein the one or more processors are further configured to fine-tune the one or more embeddings to make them semantically, syntactically and contextually aware.

7. The system as claimed in claim 1, wherein the one or more processors are configured to train the set of data packets received to generate a trained model for automated retrofitting of a plurality of words.

8. A method for facilitating dynamic retrofitting of one or more embeddings of a word, said method comprising:

receiving, by one or more processors, a set of data packets from the one or more computing devices, the set of data packets pertaining to a plurality of words, wherein the one or more processors are coupled to one or more computing devices in a network, wherein the one or more processors are further coupled with a memory, and wherein said memory stores instructions executed by the one or more processors;

receiving, by the one or more processors, a predefined set of instructions from a knowledgebase associated with a centralized server operatively coupled to the one or more computing devices;

extracting, by the one or more processors, a set of attributes from the set of data packets received, the set of attributes pertaining to one or more embeddings of each word of the plurality of words, wherein the one or more embeddings are syntactically, semantically and contextual aware;

determining, by the one or more processors, a similarity score based on the set of attributes extracted and the predefined set of instructions;

determining, by the one or more processors, one or more synonymous vectors of each said word with the plurality of words received based on the determined similarity score;

determining, by the one or more processors, a dissimilarity score based on the set of attributes extracted and the predefined set of instructions;

determining, by the one or more processors, one or more of antonym vectors of each said word with the plurality of words received based on the dissimilarity score;

determining, by the one or more processors, a value of margin of each said word with the plurality of words received based on the one or more synonymous vectors and the one or more antonym vectors determined;

dynamically modifying, by the one or more processors, the value of margin of each said word with the plurality of words received based on a domain-specific classifier that determines an extent of retrofitting required for each word pair;

bringing, by the one or more processors, a set of synonymous words in the plurality of the words nearer to each other based on the modified value of margin; and determining, by the one or more processors, a regularization loss responsible for preserving or modifying the one or more embeddings of each said word.

9. The method as claimed in claim 8, wherein the method further comprises the steps of:

determining, by the one or more processors, an antonym loss for each antonym vector responsible for increasing a separation distance between one or more antonym vectors and each said antonym vector; and determining, by the one or more processors, a synonymy loss for each synonymous vector responsible for reducing the separation distance between one or more synonymous vectors and each said synonymous vector.

10. The method as claimed in claim 8, wherein the method further comprises the step of:

determining, by the one or more processors, a first Delta International Commission on Illumination (CIE) score to update the one or more synonymous vectors to make the one or more synonymous vectors similar by a predefined value; and determining, by the one or more processors, a second Delta CIE score to update the one or more antonym vectors to make the one or more antonym vectors dissimilar by a predefined value.

11. The method as claimed in claim 8, wherein the method further comprises the step of:

choosing automatically, by the one or more processors, similar or dissimilar words based on updated one or more embeddings of each said word.

* * * * *